United States Patent Office 3,456,016
Patented July 15, 1969

3,456,016
PRODUCTION OF BIS-(β-HYDROXYALKYL)-
SULFONES
Harry Distler, Ludwigshafen (Rhine), Germany, assignor to Badische Anilin- & Soda-Fabrik Aktiengesellschaft, Ludwigshafen (Rhine), Germany
No Drawing. Filed Nov. 16, 1966, Ser. No. 594,667
Claims priority, application Germany, Nov. 27, 1965, B 84,743
Int. Cl. C07c 147/02
U.S. Cl. 260—607     7 Claims

ABSTRACT OF THE DISCLOSURE

Process for the production of bis-(β-hydroxyalkyl)-sulfones in which salts of hydroxymethanesulfinic acid are reacted with ethylene oxide or propylene oxide in an inert solvent at a temperature of from 0° to 100° C. and a pH value of from 4 to 10 with the addition of acid. In the process bis-(β-hydroxyalkyl)-sulfones are produced in a simple one-step reaction in excellent yields. Bis-(β-hydroxyalkyl)-sulfones are used as textile auxiliaries.

---

This invention relates to a method of producing bis-(β-hydroxyalkyl)-sulfones from salts of hydroxymethanesulfinic acid.

It is known that dialkylsulfones may be obtained by oxidation from the corresponding thioethers. In the case of bis-(β-hydroxyalkyl)-sulfones only weak oxidizing agents can be used as otherwise the hydroxyalkyl groups are also oxidized. Bis-(β-hydroxyethyl)-sulfone, for example, is prepared by air oxidation from the corresponding thioether. This method is troublesome and gives poor yields. It is also known from British patent specification No. 1,039,376 that equimolar amounts of bis-(β-hydroxyethyl)-sulfone and the salt of β-hydroxyethylsulfonic acid are obtained by the action of ethylene oxide on salts of dithionous acid in the alkaline pH range. In this process a byproduct is unavoidably formed in the stoichiometric proportion which has to be separated in a separate step and may be troublesome. Moreover, it may be hard to find an outlet for this byproduct.

It is an object of the present invention to provide a process for producing bis-(β-hydroxyalkyl)-sulfones in a single-step reaction. Another object of the invention is to provide a process by which bis-(β-hydroxyalkyl)-sulfones may be obtained in excellent yields. A further object of the invention is to provide a process for the production of bis-(β-hydroxyalkyl)-sulfones which does not give byproducts that are troublesome to separate. Other objects and advantages of the invention will become apparent from the following detailed description.

In accordance with this invention these objects and advantages are achieved by reacting salts of hydroxymethanesulfinic acid with 1,2-epoxides having from 2 to 3 carbon atoms in inert solvents at temperatures of from 0 to 100° C. at a pH value of from 4 to 10 with the addition of acid.

According to the new process, bis-(β-hydroxyalkyl)-sulfones are obtained in a simple single-step reaction in excellent yields. It is a special advantage of the process that it does not give unavoidable byproducts that are difficult to separate.

The process according to this invention is based upon the surprising discovery that salts of hydroxymethanesulfinic acids react with 1,2-epoxides to form bis-(β-hydroxyalkyl)-sulfones with the elimination of the organic radical. The reaction of sodium hydroxymethanesulfinate with ethylene oxide and hydrogen chloride can be represented by the following equation:

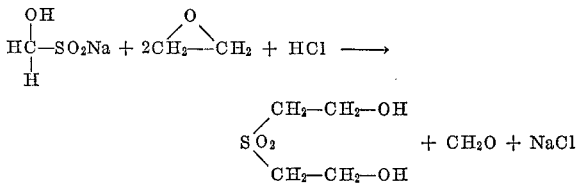

Preferred salts of hydroxymethanesulfinic acid are alkali metal salts such as sodium or potassium salts. Other salts, e.g. zinc salts, may however also be used. Salts of hydroxymethanesulfinic acid are prepared by the reaction of a bisulfite, e.g. sodium metabisulfite, with formaldehyde and subsequent reduction, e.g. with sodium amalgam.

Preferred 1,2-epoxides are ethylene oxide and propylene oxide.

The salts of hydroxymethanesulfinic acid are preferably reacted with the 1,2-epoxide in stoichiometric proportions. It is however also possible to use either component in excess, preferably an up to 20 mole percent excess.

Examples of acids that may be used are non-oxidizing mineral acids such as sulfuric acid, hydrochloric acid or phosphoric acid, or organic acids such as formic acid or acetic acid. It is advantageous to use the acids as dilute aqueous solutions, preferably in stoichiometric proportions.

The process is carried out so that a pH of from 4 to 10 is maintained during the reaction. Especially good results are achieved by maintaining a pH of from 7 to 9.

The reaction usually proceeds at a temperature of from 0 to 100° C. It is particularly advantageous to use temperatures of from 50 to 90° C.

The solvent used for the reaction should be inert under the reaction conditions. Although aqueous solutions are usually employed, it is possible to use inert organic solvents, for example hydrocarbons such as benzene or toluene, chlorohydrocarbons such as chloroform or carbon tetrachloride, or ethers such as tetrahydrofuran or dioxane. The amount of solvent may be varied within wide limits.

The process according to this invention is advantageously carried out by placing a salt of hydroxymethanesulfinic acid as an aqueous solution or as a suspension in one of the said solvents in a vessel fitted with a stirrer and a pH meter and adding the 1,2-epoxide and the acid during the course of several hours, e.g. eight hours, at the desired temperature. The 1,2-epoxide may be introduced in gaseous form, or the reaction may be carried out under pressure with the gas in the liquefied state. The 1,2-epoxide and the acid are expediently added at such a rate that the said pH values are maintained. When the reaction is complete, the solution is cooled and the salt which separates out is removed by conventional methods such as filtration or centrifuging. Then the inert solvent is distilled off from the solution. The residue obtained is an oil which solidifies to form a crystalline pulp.

The compounds obtainable according to the invention are used as textile auxiliaries.

The invention is illustrated by, but not limited to, the following examples. The parts specified in the examples are by weight.

Example 1

1,500 parts of water and 924 parts of sodium hydroxymethane sulfinate·2H₂O are placed in a vessel fitted with a stirrer and a pH meter. While maintaining a pH of 7 to 9 in the reaction solution, 800 parts of propylene oxide and 600 parts of 49% by weight aqueous sulfuric acid are simultaneously fed in at 60 to 80° C. from separate vessels over a period of eight hours. The sodium sulfate formed is cooled to approx. 0° C. and removed by filtration. The aqueous solution of the bis-(β-hydroxyisopropyl)-sulfone is concentrated in vacuo until a temperature of 120° C. is reached in the bottoms. 1060 parts of a colorless oil is obtained which solidifies to form a crystalline slurry. The yield is 97% of the theory.

OH number: calculated, 616; found, 622.

Example 2

462 parts of sodium hydroxymethane sulfinate·2H$_2$O is dissolved in 500 parts of water in a vessel fitted with a stirrer and a pH meter and 284 parts of gaseous ethylene oxide is fed in at 60 to 80° C. during the course of about six hours, a pH of approx. 7 to 9 being maintained throughout the period of introduction of the gas by running in approx. 300 parts of 49% by weight sulfuric acid. The reaction solution is cooled to approx. 0° C. and the precipitated sodium sulfate decahydrate removed by filtration. The water is distilled off from the aqueous solution in vacuo until a temperature of 120° C. is reached in the bottoms. The residue is 460 parts of a colorless oil which crystallizes upon prolonged standing. After recrystallization from a mixture of ethanol and chloroform, the bis(β-hydroxyethyl)-sulfone has a melting point of 50° C. The yield is 92.6% of the theory.

We claim:

1. A process for the production of bis-(β-hydroxyalkyl)-sulfones which comprises reacting salts of hydroxymethanesulfinic acid with ethylene oxide or propylene oxide in an inert solvent at temperatures of from 0 to 100° C. at a pH-value of from 4 to 10 with the addition of acid.

2. A process as claimed in claim 1 wherein sodium, potassium or zinc hydroxymethane sulfinates are used.

3. A process as claimed in claim 1 wherein water is used as the solvent.

4. A process as claimed in claim 1 wherein a temperature of from 50 to 90° C. is used.

5. A process as claimed in claim 1 wherein sulfuric acid, hydrochloric acid, phosphoric acid, formic acid or acetic acid is used as the acid.

6. A process as claimed in claim 1 carried out at a pH of from 7 to 9.

7. A process as claimed in claim 1 wherein salts of hydroxymethanesulfinic acids are reacted with 1,2-epoxides in stoichiometric proportions.

References Cited

UNITED STATES PATENTS 2,378,551   6/1945   Hentrich et al. _____ 260—607
3,277,163   10/1966  Waldmann et al. __ 260—607 XR CHARLES B. PARKER, Primary Examiner D. R. PHILLIPS, Assistant Examiner U.S. Cl. X.R.

260—513.7, 606